(12) United States Patent
Amradkar et al.

(10) Patent No.: US 8,271,536 B2
(45) Date of Patent: Sep. 18, 2012

(54) MULTI-TENANCY USING SUITE OF AUTHORIZATION MANAGER COMPONENTS

(75) Inventors: Purushottam Shridhar Amradkar, Redmond, WA (US); Arun Ramanathan Chandrasekhar, Bellevue, WA (US); Percy Dara Fitter, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 12/271,716

(22) Filed: Nov. 14, 2008

(65) Prior Publication Data

US 2010/0125612 A1    May 20, 2010

(51) Int. Cl.
    *G06F 17/30*    (2006.01)
(52) U.S. Cl. ............... 707/802; 707/E17.014; 709/229; 726/4; 726/9
(58) Field of Classification Search .................. 707/802, 707/E17.014; 709/229; 726/4, 9
    See application file for complete search history.

(56) References Cited

U.S. PATENT DOCUMENTS

| | | | |
|---|---|---|---|
| 6,055,637 A * | 4/2000 | Hudson et al. .................. | 726/20 |
| 7,263,523 B1 | 8/2007 | Germscheid | |
| 7,360,096 B2 | 4/2008 | Bracewell | |
| 2003/0005117 A1* | 1/2003 | Kang et al. ..................... | 709/225 |
| 2003/0177376 A1* | 9/2003 | Arce Velleggia et al. ..... | 713/189 |
| 2004/0128546 A1* | 7/2004 | Blakley et al. ................ | 713/201 |
| 2006/0080352 A1 | 4/2006 | Boubez | |
| 2006/0080546 A1* | 4/2006 | Brannon et al. .............. | 713/185 |
| 2006/0123234 A1 | 6/2006 | Schmidt | |
| 2007/0289004 A1 | 12/2007 | Chao | |
| 2008/0046983 A1 | 2/2008 | Lester | |
| 2010/0198730 A1* | 8/2010 | Ahmed et al. ................. | 705/50 |

OTHER PUBLICATIONS

"A Framework for Native Multi-Tenancy Application Development and Management", Chang Jie Guo, Wei Sun, Ying,Huang, zhi Hu Wang, Bo Gao (hereafter Guo et al.), 10.1109/CEC-EEE.2007.4, Aug. 8, 2007.*
Sharma, Anshu "Oracle SaaS Platform: Building On-Demand Application", Jun. 2007 pp. 1-19.
Brokered Authentication, Patterns & Practices, Dec. 2005 website: http://msdn.microsoft.com/en-us/library/aa480560(printer).aspx.
Lemay, Kevin and Andrew Latham, "Cross Enterprise SSO Using Federation", May 27, 2008, pp. 1-22.
Del Vecchio, David, Marty Humphrey, Jim Basney, Nataraj Nagaratnam, "CredEx: User-Centric Credential Management for Grid and Web Services", Jul. 2005, pp. 1-8.
Sethu, Saji, "Web Services Security and Federated Identity Authentication", pp. 1-36.

(Continued)

*Primary Examiner* — Fred I Ehichioya
*Assistant Examiner* — Shiow-Jy Fan
(74) *Attorney, Agent, or Firm* — Workman Nydegger

(57) ABSTRACT

Embodiments described herein are directed to implementing a multi-tenancy service component configured to provide multi-tenancy capabilities for submitted services. In one embodiment, a computer system instantiates a hosting service that includes a multi-tenancy component configured to provide resource access to multiple users through a single multi-tenant resource instance. The computer system receives a submitted service submitted to be hosted by the hosting service. The submitted service includes a portion of use information usable to configure parameters of the multi-tenancy component. The computer system configures the multi-tenancy component to provide resource access for multiple users through a single multi-tenant resource instance, where each user provides a resource instance claim indicating a resource instance level authorization for the user. The computer system also provides resource access to each of the users through the single multi-tenant resource instance, based on the resource instance level authorization included in the resource instance claim.

18 Claims, 5 Drawing Sheets

OTHER PUBLICATIONS

Fugkeaw, Somchart, Piyawit Manpanpanich and Sekpon Juntapremjitt, "Multi-Application Authentication based on Multi-Agent System", May 24, 2007, website: http://www.iaeng.org/IJCS/issues_v33/issue_2/IJCS_33_2_6.pdf.

* cited by examiner

MULTI-TENANCY USING SUITE OF AUTHORIZATION MANAGER COMPONENTS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, a client computer system might connect to a server in a datacenter to access a service. The service could provide simple or very complex functionality, and may be able to communicate with other services in the process. Such services are often referred to as software as a service or SAAS.

In some cases, it may be desirable for a developer of a service to offload the finalized service to another person or business for hosting. Such hosting businesses often have proprietary implementations in place, requiring the developer to add specific scripts or other code to enable communication between the hosting company's servers and the developer's service. Furthermore, in many cases, services hosted by hosting servers may be limited when providing resources to multiple users.

BRIEF SUMMARY

Embodiments described herein are directed to implementing a multi-tenancy service component configured to provide multi-tenancy capabilities for submitted services. In one embodiment, a computer system instantiates a hosting service that includes a multi-tenancy component configured to provide resource access to multiple users through a single multi-tenant resource instance. The computer system receives a submitted service submitted to be hosted by the hosting service. The submitted service includes a portion of use information usable to configure parameters of the multi-tenancy component. The computer system configures the multi-tenancy component to provide resource access for multiple users through a single multi-tenant resource instance, where each user provides a resource instance claim indicating a resource instance level authorization for the user. The computer system also provides resource access to each of the users through the single multi-tenant resource instance, based on the resource instance level authorization included in the resource instance claim.

In another embodiment, a computer system instantiates an online hosting service that includes a multi-tenancy component configured to provide resource access to multiple users through a single multi-tenant resource instance. The computer system receives a submitted service submitted to be hosted by the online hosting service. The submitted service includes use information usable to configure parameters of the multi-tenancy component. The computer system configures the multi-tenancy component to provide resource access to resources for a plurality of authenticated users through a single multi-tenant resource instance. Each user provides a validated security token generated from the users' credentials, where the security token includes a resource instance claim indicating a resource instance level authorization for the user. The computer system accesses an authentication database to verify that some of the users have rights to access resources through the single resource instance based on each user's corresponding validated security token and provide resource access to each of the authenticated users through the single multi-tenant resource instance, based on the resource instance level authorization included in the resource instance claim.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1A:
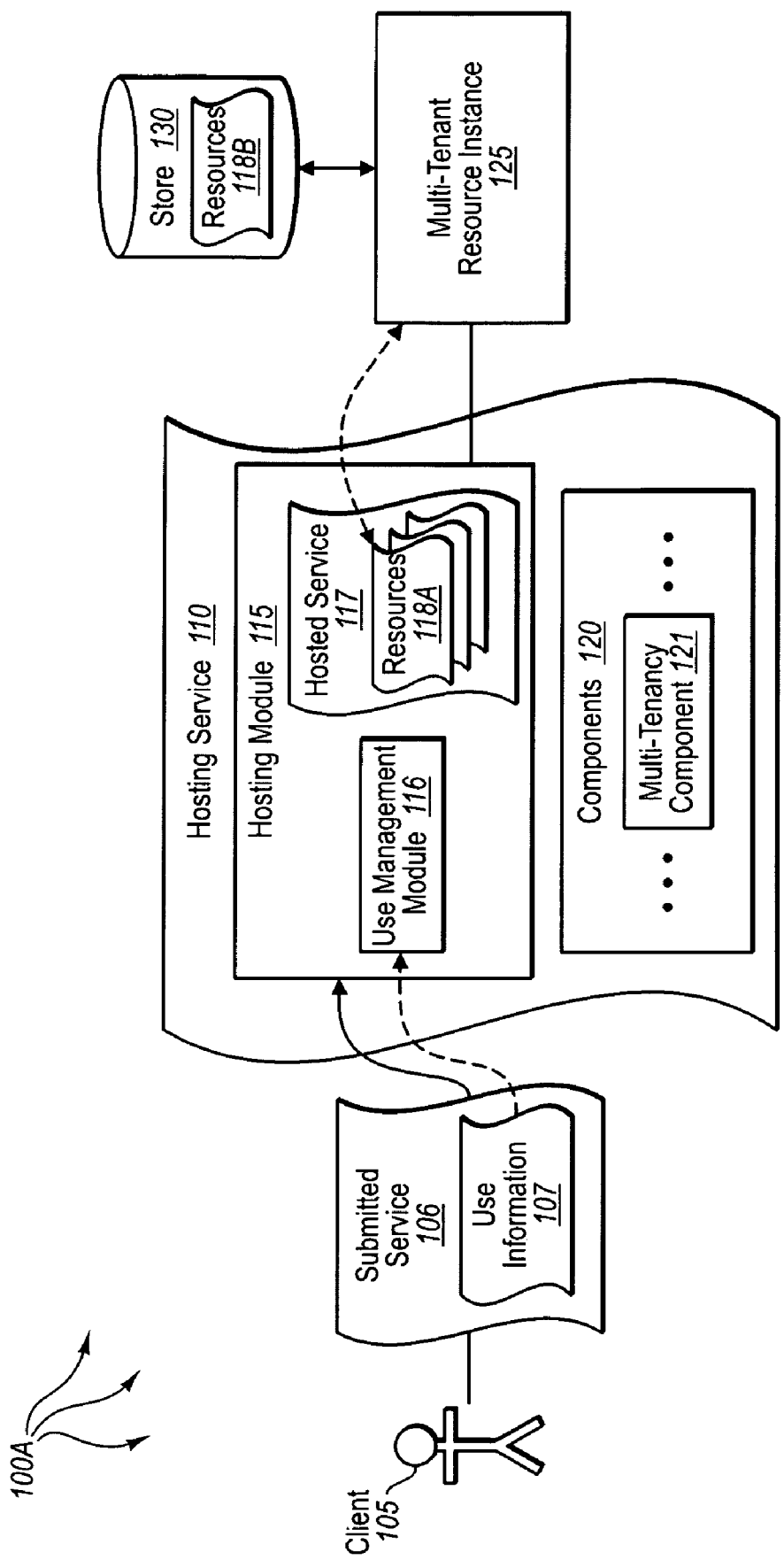
FIGS. 1A & 1B illustrate a computer architecture in which embodiments of the present invention may operate including implementing a multi-tenancy service component configured to provide multi-tenancy capabilities for submitted services.

Embodiments described herein are directed to implementing a multi-tenancy service component configured to provide multi-tenancy capabilities for submitted services. In one embodiment, a computer system instantiates a hosting service that includes a multi-tenancy component configured to provide resource access to multiple users through a single multi-tenant resource instance. The computer system receives a submitted service submitted to be hosted by the hosting service. The submitted service includes a portion of use information usable to configure parameters of the multi-tenancy component. The computer system configures the multi-tenancy component to provide resource access for multiple users through a single multi-tenant resource instance, where each user provides a resource instance claim indicating a resource instance level authorization for the user. The computer system also provides resource access to each of the users through the single multi-tenant resource instance, based on the resource instance level authorization included in the resource instance claim.

In another embodiment, a computer system instantiates an online hosting service that includes a multi-tenancy component configured to provide resource access to multiple users through a single multi-tenant resource instance. The computer system receives a submitted service submitted to be hosted by the online hosting service. The submitted service includes use information usable to configure parameters of the multi-tenancy component. The computer system configures the multi-tenancy component to provide resource access to resources for a plurality of authenticated users through a single multi-tenant resource instance. Each user provides a validated security token generated from the users' credentials, where the security token includes a resource instance claim indicating a resource instance level authorization for the user. The computer system accesses an authentication database to verify that some of the users have rights to access resources through the single resource instance based on each user's corresponding validated security token and provide resource access to each of the authenticated users through the single multi-tenant resource instance, based on the resource instance level authorization included in the resource instance claim.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates a computer architecture 100A in which the principles of the present invention may be employed. Computer architecture 100A includes hosting service 110. Hosting service 110 may be a software program that operates on a computer system (not shown). Service 110 may run on any type of computer system including a web server, database server or any computer system running as part of a cloud computing architecture. Hosting service 110 may be run as a web service, accessible by users such as client 105. Client 105 may be any type of computer user including an end-user, computer administrator, software developer or other user.

In some cases, client 105 may upload or submit a service 106. Submitted service 106 may be any type of online service, software program or other code portion. Service 106 may be submitted by a user or by another computer system or service. Service 106 may be submitted to a service delivery platform that is part of an online service provided by a datacenter or other server. Use information 107, generally included with service 106 (although it may be transmitted separately), is information describing hosting parameters for the service. For example, use information 107 may include settings describing how hosting service 110 is to host service 106, or which hosting service components (e.g. 120) are to be used in conjunction with hosting service 106. Use management module 116 may be configured to receive and determine, based on information 107, how service 106 is to be hosted and/or which components 120 are to be used during the hosting.

Hosting service 110 includes hosting module 115, which may be configured to host services, and includes use management module 116. After submitted service 106 has been accepted for hosting by service 110, service 106 may be represented generally as a hosted service 117. Hosted service 117 may include a plurality of hosted services, submitted from multiple different users. Users such as client 105 may submit any number of services for hosting by hosting service 110. In some embodiments, hosting service 110 may be distributed over multiple different server computing systems, and is scalable to host substantially any number of user or other submitted services.

Generally, services provide resources (e.g. resources 118A). Each service may provide any number of resources accessible by various users. Each resource provided to a user may be viewed as an instance of that resource. In some embodiments, a single resource instance may be provided to a plurality of different users (e.g. multi-tenant resource instance 125). As used herein, the terms "multi-tenant" or "multi-tenancy" refer to a plurality of different users or tenants accessing a resource or resource instance. Thus, if a resource instance is multi-tenant, that resource instance may provide the resource to a plurality of different users. This will be explained in greater detail with regard to FIG. 1B.

As mentioned above, hosting service 110 includes components 120. Components 120 may include a variety of different components or plug-in services usable by client 105 for hosting the user's submitted services. The submitter may indicate in use information 107 which components are to be used in hosting the submitted service, and may further indicate parameters for using the various components. Thus, for example, user 105 may indicate in use information 107 that multi-tenant component 121 is to be used when hosting service 106. User 105 may use component 121 to enable multiple users to access resources 118A through a single resource instance (e.g. 125). Additionally or alternatively, user 105 may use component 121 to enable multiple users to access other resources 118B located on data store 130. Data store 130 may include any type of data storage hardware and/or software, and may be located on the same or a different computer system than the system on which hosting service 110 is running. These concepts will be explained in greater detail below with regard to method 200 of FIG. 2 below.

Figure 1B:
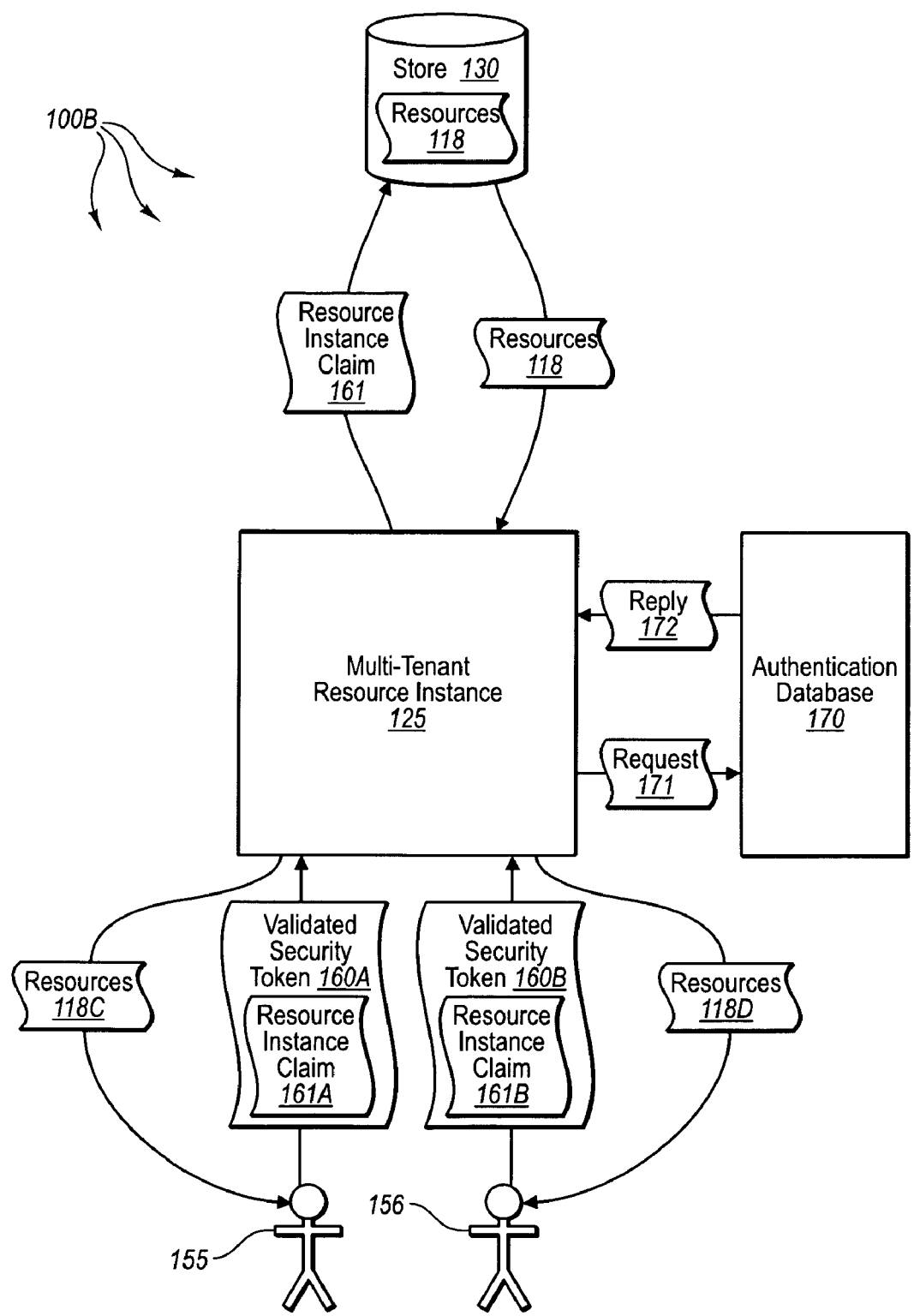

FIG. 1B illustrates a computer architecture 100B in which the principles of the present invention may be employed. Computer architecture 100B is similar to architecture 100A, and, in general, like reference numbers refer to like components. Multi-tenant resource instance 125 may be configured to allow multiple users to access various hosted service resources by authenticating the users before supplying them with the resource. For example, users 155 and 156 (which may be different than or the same as user 105) may both wish to access resources 118 in store 130. Each user may submit separate validated security tokens 160A and 160B, respectively to multi-tenant resource instance 125 (hereinafter instance 125). Instance 125 (or hosting module 115) may send request 171 to authentication database 170 to confirm that each user is separately authorized to access resources 118. Request 171 may include, for each user, resource instance claim 161A/161B, where each claim respectively indicates which rights the user has to the resources.

For example, a resource instance claim may indicate that the user has one or more of the following rights: read, write, execute, or other rights as may be applicable for a given resource. Upon authenticating the user's validated security token, and verifying the user's resource instance claim (i.e. that the user actually has the rights indicated in the claim), authentication database 170 sends reply 172 to instance 125, indicating that the user is (or is not) authorized to access resource 118. As used herein, resource 118 may include any specific instance of a resource (e.g. 118A, 118B, 118C or 118D) or may refer to resources provided by hosted service 117 in general. Thus, upon receiving an indication that both user 155 and user 156 are authorized and have valid resource instance claims, each user's resource claim 161 is sent to store 130, whereupon resources 118 are sent to and provided to each user by multi-tenant resource instance 125. It will be understood that either user (or any other user not shown) may be denied access by authentication database 170 as having an invalid (e.g. expired) security token or invalid resource instance claim. In such cases, reply 172 would include an indication of which users were denied access, and instead of sending the requested resources (e.g. 118C and 118D), a notification that access was denied would be sent. These and other concepts will be described in greater detail below with reference to method 400 of FIG. 4.

Figure 2:
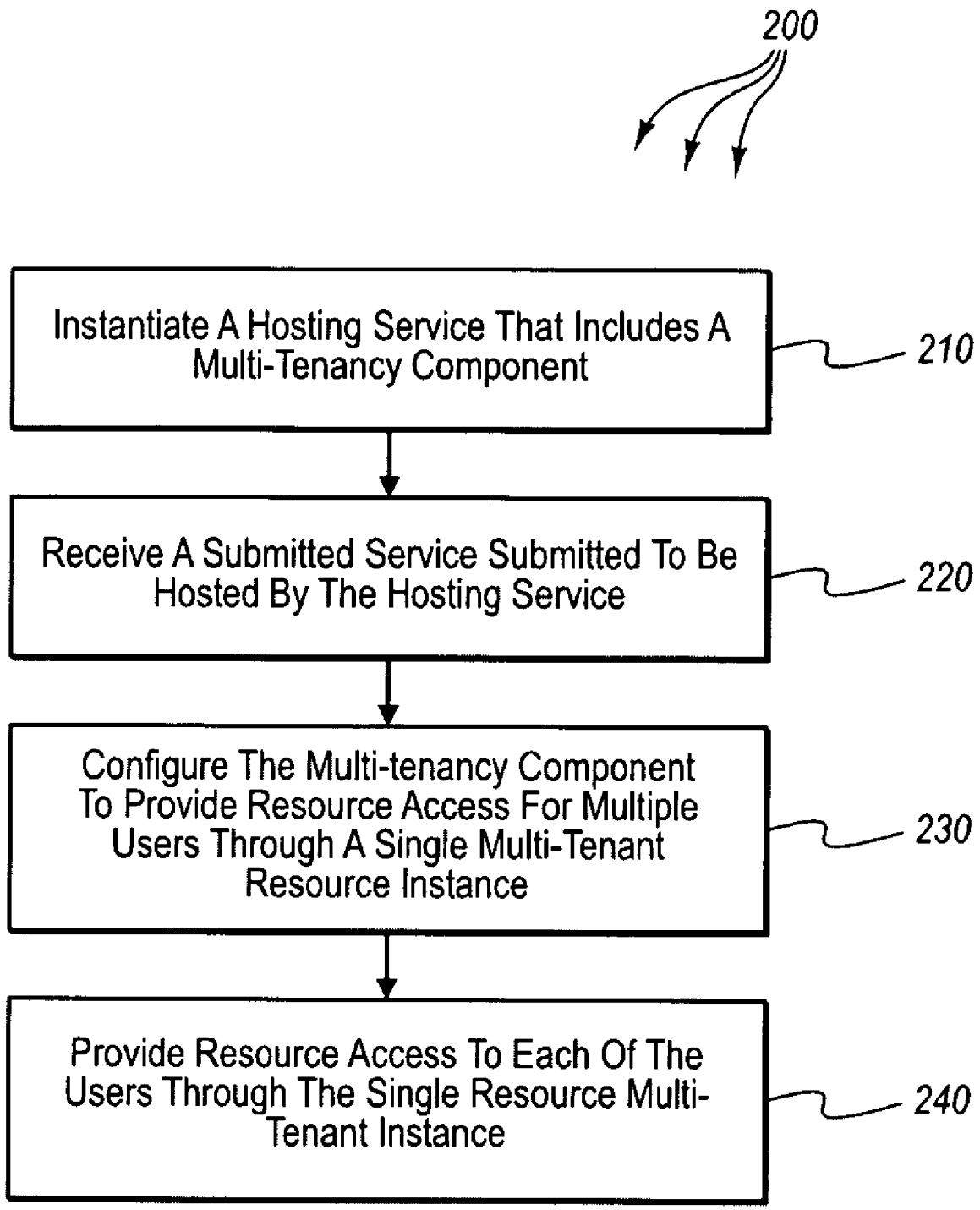
FIG. 2 illustrates a flowchart of an example method for implementing a multi-tenancy service component configured to provide multi-tenancy capabilities for submitted services.

FIG. 2 illustrates a flowchart of a method 200 for implementing a multi-tenancy service component configured to provide multi-tenancy capabilities for submitted services. The method 200 will now be described with frequent reference to the components and data of environments 100A & 100B.

Method 200 includes an act of instantiating a hosting service that includes a multi-tenancy component configured to provide resource access to a plurality of users through a single multi-tenant resource instance (act 210). For example, hosting service 110 may be instantiated by a server in a cloud database comprised of a plurality of computer servers. Hosting service 110 may include multi-tenancy component 121 which may be configured to provide access to resources 118A and/or 118B to a plurality of users through a single multi-tenant resource instance 125. In some embodiments, each resource may include a resource identifier linking the resource to one or more resource instance claims (e.g. 161A/161B). This resource identifier may be validated against at least one of the resource instance claims to determine that the user (e.g. 155 and/or 156) has access rights of the type requested for the resource requested.

For example, as described above in reference to FIG. 1B, user 155 may send validated security token 160A including resource instance claim 161A to multi-tenant resource instance 125. Resource instance claim 161A includes an indication of which resources are to be accessed and which rights user 155 purports to have (i.e. a rights claim). This rights claim is verified by authentication database 170 to determine that the user does indeed have read, write and/or execute rights for the resource requested.

Thus, for instance, if the resource was a mailbox, and the resource instance was a particular user's mailbox, the user's resource instance claim would be accessed to verify that the user had the purported read, write and/or execute rights to the email items in the user's mailbox. It will be appreciated that this mailbox example is only one example of a resource or resource instance, and that any type of resource may be provided by hosted service 117, and further, that any type of rights may be purported in resource instance claim 161A/161B. Upon determining that a user does not have the indicated rights, the user will be notified of such. It should also be noted that, as will be explained in greater detail below, resource instance claims 161A and/or 161B may have been previously validated or authenticated before being sent to multi-tenant resource instance 125. In such cases, it may be possible for resource instance 125 to send the corresponding resource instance claim 161 directly to store 130, without sending the claim to authentication database 170 for authentication.

Returning to FIG. 2, method 200 also includes an act of receiving a submitted service submitted to be hosted by the hosting service, where the submitted service includes a portion of use information usable to configure one or more parameters of the multi-tenancy component (act 220). For example, hosting service 110 may receive submitted service 106 submitted to be hosted by hosting service 110. Service 106 includes use information 107 usable to configure various parameters of multi-tenancy component 121.

For example, component 121 may have parameters specifying how it is to be used in conjunction with other components 120 of hosting service 110 (e.g. a billing component, provisioning, service level management, resource manager, syndication, or other components). Other parameters may include limitations on the number or type of users permitted to use service 106 or limitations on the resources provided by service 106. Many other parameters may be adjusted or set using use information. In some cases, use information 107 includes metadata, resulting in a metadata-driven, user-submission process that allows users to upload services for hosting while controlling how the submitted service is to be hosted. Multi-tenancy component 121 may, additionally, provide users with an indication of customizable multi-tenancy component parameters that are implementable using use information.

Method 200 includes an act of configuring the multi-tenancy component to provide resource access for a plurality of users through a single multi-tenant resource instance, where each user provides a resource instance claim indicating a resource instance level authorization for the user (act 230). For example, multi-tenancy component 121 may be configured to provide resource access for users 155 and/or 156 through multi-tenant resource instance 125. Each user provides a resource instance claim (161A/161B) indicating a resource instance level authorization for each user. The resource instance level authorization indicates that, as described above, the user has the rights purported in the claim (i.e. that the user has rights to access the resource in the manner indicated in the claim).

Figure 3:
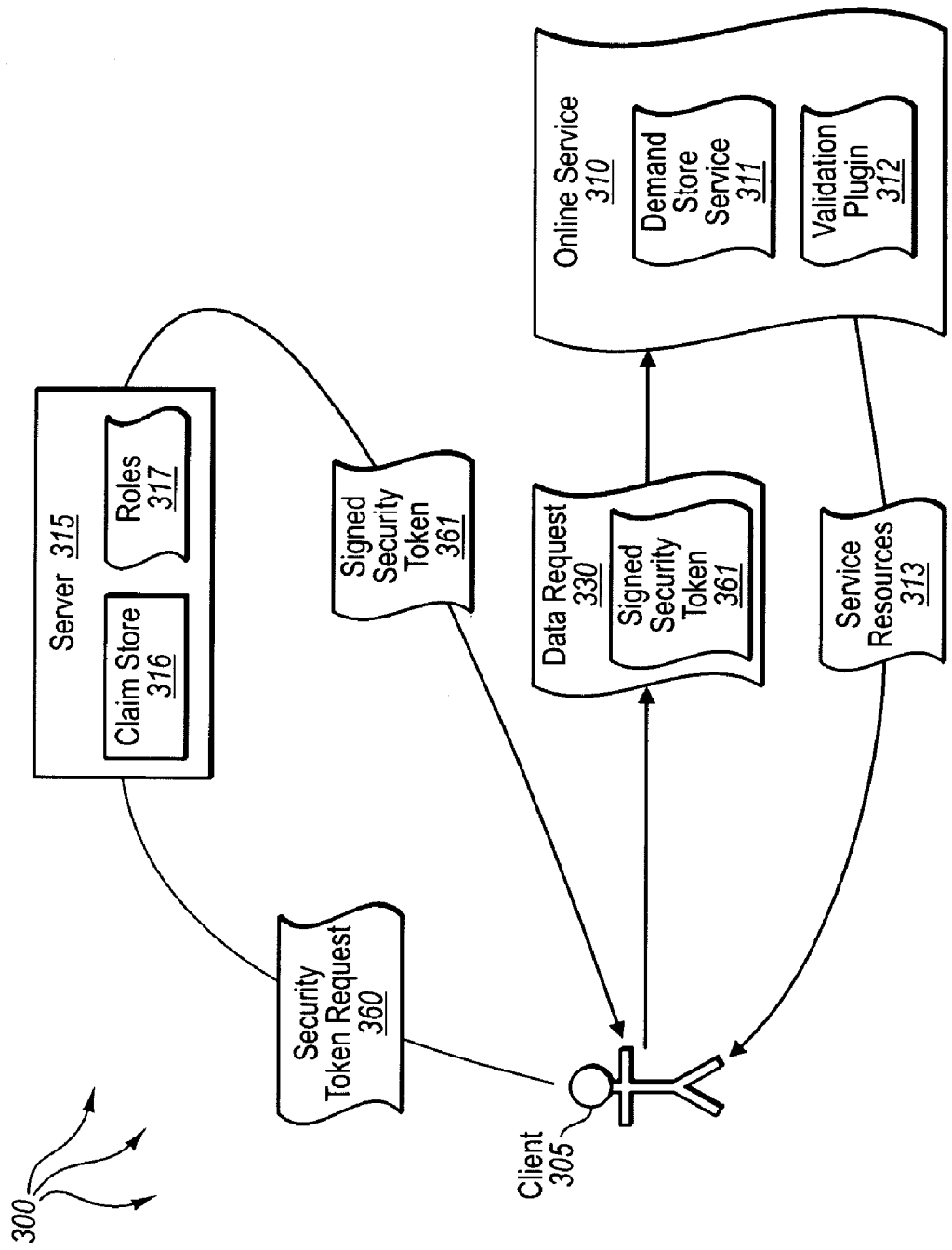
FIG. 3 illustrates an embodiment of the present invention in which client-server communication is facilitated.

In some embodiments, each user provides a validated security token generated from the users' credentials. The validated security token (160A/160B) may be generated by server 315, as shown in architecture 300 of FIG. 3. Client 305 (which may be the same as or different than client 105) may send security token request 360 to server 315, requesting that user 305 be authenticated. Server 315 (which may be the same as or different than authentication database 170) may receive and access security token request 360 to determine which claims or rights the user has in association with a multi-tenancy resource instance. Claim store 316 may store a plurality of claims, and may indicate which rights client 305 has in association with resource instance 125.

Additionally or alternatively, client 305 may be associated with or belong to a group or user type which may be associated with a certain role. Upon determining that a user is associated with a role based on membership in a group or user type, the rights associated with that role may be conveyed to the user. After determining the user's rights (if any) in association with resource instance 125, the user is either denied access (if the user has no rights) or signed security token 361 is sent to user 305 indicating the user's rights in association with multi-tenant resource instance 125. In some cases, authentication database 170 may establish a trust relationship with server 315, such that token signed by server 315 are trusted by database 170 as being authentic and valid. A validated, signed security token may include an indication that the user that sent security token request 360 is assigned to a role that has access to the single resource instance (e.g. instance 125). In some cases, a role may indicate rights for a plurality of users across a domain or federation.

It may be determined, in some cases, that at least two of a plurality of users have rights to access resources through the single multi-tenant resource instance based on each user's corresponding validated security token. Thus, in such cases, a single multi-tenant resource instance 125 may be provided, the resources of which are only available to authenticated users who have rights to access the instance. Each authenticated user can then access a customized virtual application instance (in cases where the resource is a software application or portion thereof), where the user has rights to use the application instance according to the user's resource instance claim.

Returning again to FIG. 2, method 200 includes an act of providing resource access to each of the users through the single resource instance, based on the resource instance level authorization included in the resource instance claim (act 240). For example, multi-tenant resource instance 125 may provide resource access to each of users 155 and 156 through instance 125, based on the resource instance level authorization included in resource instance claims 161A/161B, respectively. Each resource instance claim may include a listing of resource instance rights corresponding to each resource provided by the submitted (hosted) service. Thus, in cases where a service provides a plurality of resources, the resource instance claim may provide a listing of a user's resource instance rights corresponding to each of the plurality of resources provided by the resource instance.

Figure 4:
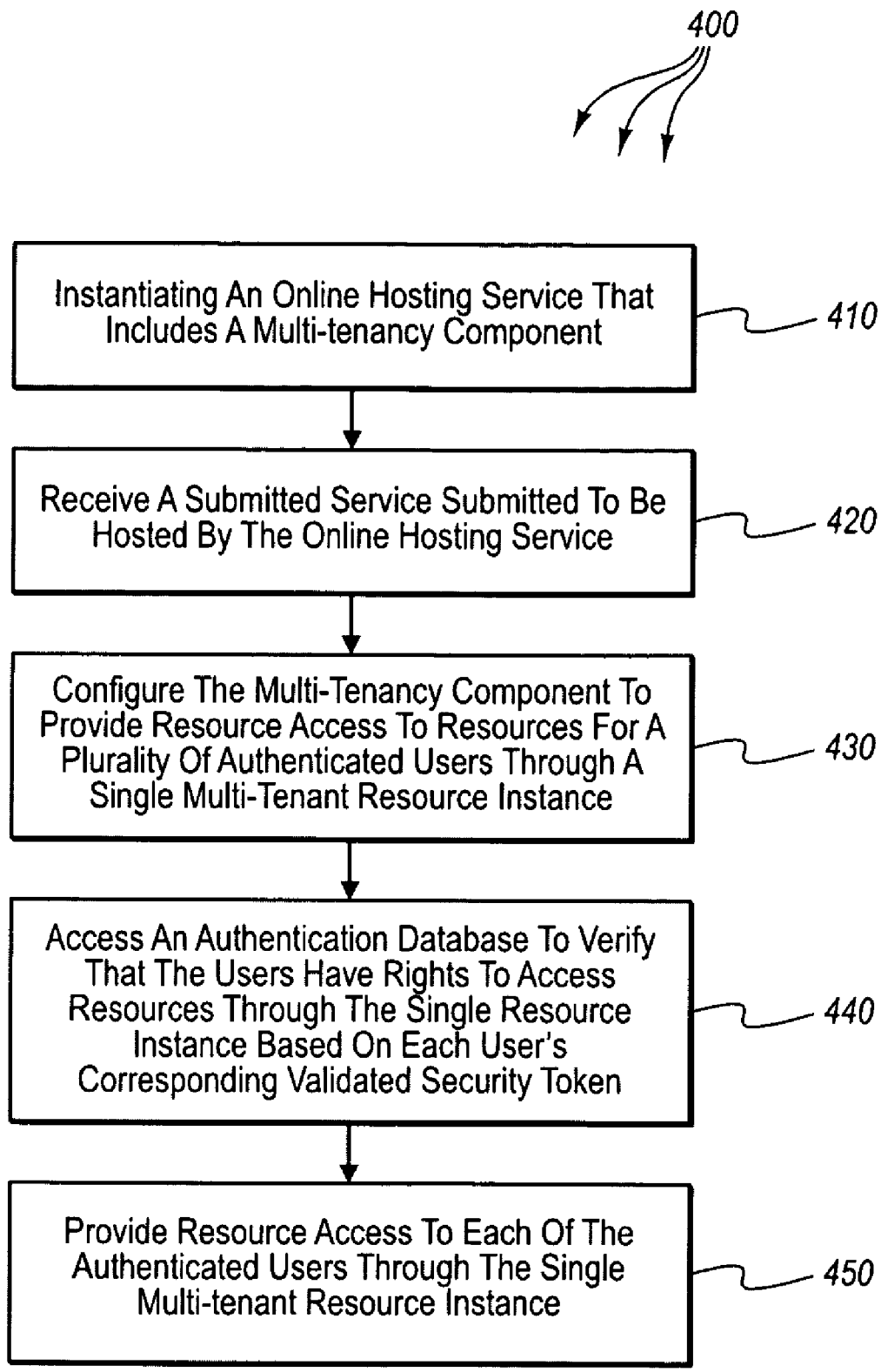
FIG. 4 illustrates a flowchart of an alternative example method for implementing a multi-tenancy service component configured to provide multi-tenancy capabilities for submitted services.

FIG. 4 illustrates a flowchart of a method 400 for implementing a multi-tenancy service component configured to provide multi-tenancy capabilities for submitted services. The method 400 will now be described with frequent reference to the components and data of environments 100A & 100B of FIGS. 1A and 1B, respectively.

Method 400 includes an act of instantiating an online hosting service that includes a multi-tenancy component configured to provide resource access to a plurality of users through a single multi-tenant resource instance (act 410). For example, an online hosting service such as hosting service 110 may be instantiated by a computer system. Service 110 may include multi-tenancy component 121 which is configured to provide access to resources 118A-118D for at least both of users 155 and 156 through multi-tenant resource instance 125.

In some embodiments, online hosting service 110 may include a plug-in configured to authorize tenants at an operation level. Thus, users 155, 156 and other users may be authorized to access at least one of resources 118A-118D by the plug-in at an operation level on the computer system running the hosting service. In some cases, the plug-in may provide an application programming interface (API) for creating, updating and deleting resource instance claims. Thus, a developer or other computer user may use such an API to create, delete and/or update resource instance claims 161A and/or 161B. The API may be used such that a service provider does not have to know how the security token authentication process works or how to implement the claims or validate and authorize against those claims. The plug-in, in effect, can be used by to abstracts away the associated complexity of managing different resource claims.

Method 400 includes an act of receiving a submitted service submitted to be hosted by the online hosting service, where the submitted service includes a portion of use information usable to configure one or more parameters of the multi-tenancy component (act 420). For example, hosting module 115 may receive submitted service 106 submitted to be hosted by online hosting service 110. Submitted service 106 may include a portion of use information 107 usable to configure various parameters of multi-tenancy component 121. As indicated above, use information 107 may be used to set a variety of parameters regarding component use in association with submitted service 106, as well as other parameters regarding how hosting module 115 is to interface with and respond to other computer systems in a surrounding cloud or other computer network.

Method 400 includes an act of configuring the multi-tenancy component to provide resource access to resources for a plurality of authenticated users through a single multi-tenant resource instance, where each user provides a validated security token generated from the users' credentials, and where the security token includes a resource instance claim indicating a resource instance level authorization for the user (act 430). For example, multi-tenancy component 121 may be configured to provide resource access to resources 118A-118D for multiple authenticated users 155 and 156 through multi-tenant resource instance 125. Each of users 155 and 156 provides validated security tokens 160A and 160B generated from the users' credentials. Security tokens 160A and 160B each include resource instance claims 161A and 161B indicating a resource instance level authorization for each user. In some cases, online hosting service 110 may implement a plurality of security token service brokers (servers). Each of these servers may be configured to authenticate the users' credentials and identify which rights the user has vis-a-vis the multi-tenant resource instance.

In some embodiments, one security token service broker may be configured to communicate with other security token service brokers on other computer systems in other domains. In this manner, each security token service broker may access resources across different domains. This allows an identity (e.g. a user's identity) to be federated across (otherwise) autonomous security domains. The federation of identities enables users of one domain (e.g. server 315) to securely access data or systems of another domain seamlessly, and (at least in some cases) without various forms of redundant user administration. The federation of user identities may be enabled through the use of open industry standards and/or openly published specifications, such that multiple parties can achieve interoperability for common use cases. Some use-cases may involve cross-domain, web-based single sign-on, cross-domain user account provisioning, cross-domain entitlement management and/or cross-domain user attribute exchange.

For instance, in one example, client 305 may sign up with a third party client to provide services. The user may send security token request 360 to server 315 which acts as a security token service broker, sending the security token request to a security token service broker provided by the third party from whom the client is to receive the service. Thus, server 315 may interact with other security token service brokers in other domains in order to validate and return a signed security token (361). This may allow some third party organizations the ability to offer web single-sign-on (SSO) to users from partner organizations. In this scenario, each organization may continue to manage its own identity stores, which include client identifiers.

In some embodiment, a user may be able to upload his or her own customized security token service configured to generate security tokens based on user credentials and/or validate authenticated tokens created by other services. Multi-tenant resource instance 125 may be configured to accept validated security tokens generated by the user's own security token service. Additionally or alternatively, instance 125 may be configured to receive a validated security token from a user connected to a different, remote datacenter server. Multi-tenant resource instance 125 may access an authentication database on the remote datacenter to verify that the user has rights to access resources provided by the online service. Thus, it should be understood that users 155 and 156, as well as their corresponding validated security tokens and resource instance claims may be received from various different services, as well as from local or remote locations.

Method 400 includes an act of accessing an authentication database to verify that at least two of the users have rights to access resources through the single resource instance based on each user's corresponding validated security token (act 440). For example, multi-tenant resource instance 125 may communicate with authentication database 170 using request 171 and reply 172 to verify that users 155 and 156 have rights to access resources through instance 125 based on each user's corresponding validated security token. Thus, returning to FIG. 3, client 305 may send data request 330 along with signed security token 361 to online service 310 (which may be user-submitted service 106) to request data and resources from the service. Demand store service 311 may perform a check to verify that, for any resource demands, proper resource instance claims have been provided by the user. Validation plug-in 312, as indicated above, may provide an API for creating, updating and deleting resource instance claims. Using plug-in 312, a developer may provide metadata to interact with the plug-in library and the underlying resource instance claims. The plug-in may also verify that the incoming claims match what is required to actually use the resource.

Method 400 includes an act of providing resource access to each of the authenticated users through the single multi-tenant resource instance, based on the resource instance level authorization included in the resource instance claim (act 450). For example multi-tenant resource instance 125 may provide resources 118C to user 155 and resources 118D to user 156 (or, alternatively, service resources 313 to client 305), based on the resource instance level authorization included in each of resource instance claims 161A and 161B, respectively. Each user has access to separate information, depending on the user's authorization level. Thus, a resource may be provided to multiple users while maintaining data isolation among each user. Accordingly, users may submit a service for hosting and include with the service use information specifying how the service is to be hosted. Moreover, a multi-tenancy component may be provided that allows multiple users to access a single resource instance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method, implemented at a server computer system in a computer networking environment that includes plurality of computing systems, the method for implementing a multi-tenancy service component configured to provide multi-tenancy capabilities to submitted services that do not otherwise provide multi-tenancy capabilities, the method comprising:

an act of instantiating a hosting service that includes a multi-tenancy component that is configurable to define how the hosting service provides resource access to one or more resources of a submitted service including enabling a single instance of the one or more resources to be accessed by a plurality of users such that the submitted service functions as a multi-tenancy service even though the submitted service does not by itself provide multi-tenancy capabilities;

an act of receiving the submitted service submitted to be hosted by the hosting service, the submitted service including a portion of use information that defines that access to a single instance of the one or more resources of the submitted service is to be provided to a plurality of users;

an act of configuring the multi-tenancy component to provide access to the single instance of the one or more resources of the submitted service to the plurality of users by configuring a validation plug-in that defines one or more resource instance claims for each of the plurality of users that define the type of access each of the plurality of users will have to the single instance of the one or more resources, wherein the plug-in provides an application programming interface for creating, updating and deleting resource instance claims in an authentication database;

an act of receiving a security token from a first of the plurality of users, the security token including one or more resource instance claims that identify the first user's purported access rights to the single instance of the one or more resources;

an act of validating the security token received from the first user, including validating the one or more resource instance claims in the security token by comparing the one or more resource instance claims in the security token to resource instance claims in the authentication database to verify that the one or more resource instance claims in the security token are included in the authentication database;

an act of providing, to the first user, access to the single instance of the one or more resources in accordance with the validated one or more resource instance claims;

an act of receiving a security token from a second of the plurality of users, the security token including one or more resource instance claims that identify the second user's purported access rights to the single instance of the one or more resources;

an act of validating the security token received from the second user, including validating the one or more resource instance claims in the security token by comparing the one or more resource instance claims in the security token to resource instance claims in the authentication database to verify that the one or more resource instance claims in the security token are included in the authentication database; and an act of providing, to the second user, access to the single instance of the one or more resources in accordance with the validated one or more resource instance claims.

2. The method of claim 1, wherein each security token is generated from the corresponding user's credentials.

3. The method of claim 2, wherein configuring a validation plug-in that defines one or more resource instance claims for each of the plurality of users that define the type of access each of the plurality of users will have to the single instance of the one or more resources comprises configuring the validation plug-in to access the authentication database to verify that one or more resource instance claims included in the received security token are authorized.

4. The method of claim 1, wherein at least one resource instance claim includes a listing of resource instance rights corresponding to each resource provided by the service.

5. The method of claim 1, wherein each authenticated user accesses a customized virtual application instance.

6. The method of claim 1, wherein the security token includes an indication that the user is assigned to a role that has access to the single instance of the one or more resources.

7. The method of claim 6, wherein the role indicates rights for a plurality of users across a federation.

8. The method of claim 1, wherein the type of access indicated in the one or more resource instance claims includes at least one of read, write and execute.

9. The method of claim 8, further comprising an act of inspecting the resource instance claim to determine the type of access the user is requesting.

10. The method of claim 9, further comprising denying the user access to the single instance of the one or more resources of the submitted service based on a determination that the user does not have rights for the type of access requested.

11. The method of claim 1, wherein each resource includes a resource identifier linking the resource to one or more resource instance claims.

12. The method of claim 11, wherein the resource identifier is validated against the resource instance claims to determine that the user has access rights of the type requested for the resource requested.

13. The method of claim 1, wherein the multi-tenancy component provides one or more users with an indication of customizable multi-tenancy component parameters that are implementable using use information.

14. A computer program product for implementing a method for implementing a multi-tenancy service component configured to provide multi-tenancy capabilities to submitted services that do not otherwise provide multi-tenancy capabilities, the computer program product comprising one or more physical storage media having stored thereon computer-executable instructions that, when executed by one or more processors of the computing system, cause the computing system to perform the method, the method comprising:

an act of instantiating a hosting service that includes a multi-tenancy component that is configurable to define how the hosting service provides resource access to one or more resources of a submitted service including enabling a single instance of the one or more resources to be accessed by a plurality of users such that the submitted service functions as a multi-tenancy service even though the submitted service does not by itself provide multi-tenancy capabilities;

an act of receiving the submitted service submitted to be hosted by the hosting service, the submitted service including a portion of use information that defines that access to a single instance of the one or more resources of the submitted service is to be provided to a plurality of users;

an act of configuring the multi-tenancy component to provide access to the single instance of the one or more resources of the submitted service to the plurality of users by configuring a validation plug-in that defines one or more resource instance claims for each of the plurality of users that define the type of access each of the plurality of users will have to the single instance of the one or more resources, wherein the plug-in provides an application programming interface for creating, updating and deleting resource instance claims in an authentication database;

an act of receiving a security token from a first of the plurality of users, the security token including one or more resource instance claims that identify the first user's purported access rights to the single instance of the one or more resources;

an act of validating the security token received from the first user, including validating the one or more resource instance claims in the security token by comparing the one or more resource instance claims in the security token to resource instance claims in the authentication database to verify that the one or more resource instance claims in the security token are included in the authentication database;

an act of providing, to the first user, access to the single instance of the one or more resources in accordance with the validated one or more resource instance claims;

an act of receiving a security token from a second of the plurality of users, the security token including one or more resource instance claims that identify the second user's purported access rights to the single instance of the one or more resources;

an act of validating the security token received from the second user, including validating the one or more resource instance claims in the security token by comparing the one or more resource instance claims in the security token to resource instance claims in the authentication database to verify that the one or more resource instance claims in the security token are included in the authentication database; and an act of providing, to the second user, access to the single instance of the one or more resources in accordance with the validated one or more resource instance claims.

15. The computer program product of claim 14, further comprising an act of receiving a validated security token from a user connected to a different, remote datacenter.

16. The computer program product of claim 15, further comprising accessing an authentication database on the remote datacenter to verify that the user has rights to access the single instance of the one or more resources of the submitted service.

17. A computer system comprising the following:
one or more processors;
system memory;
one or more computer-readable storage media having stored thereon computer-executable instructions that, when executed by the one or more processors, causes the computing system to perform a method for providing a service delivery platform with a multi-tenancy service component configured to provide multi-tenancy capabilities for user-submitted services, the method comprising the following:

an act of instantiating a hosting service that includes a multi-tenancy component that is configurable to define how the hosting service provides resource access to one or more resources of a submitted service including enabling a single instance of the one or more resources to be accessed by a plurality of users such that the submitted service functions as a multi-tenancy service even though the submitted service does not by itself provide multi-tenancy capabilities;

an act of receiving the submitted service submitted to be hosted by the hosting service, the submitted service including a portion of use information that defines that access to a single instance of the one or more resources of the submitted service is to be provided to a plurality of users;

an act of configuring the multi-tenancy component to provide access to the single instance of the one or more resources of the submitted service to the plurality of users by configuring a validation plug-in that defines one or more resource instance claims for each of the plurality of users that define the type of access each of the plurality of users will have to the single instance of the one or more resources, wherein the plug-in provides an application programming interface for creating, updating and deleting resource instance claims in an authentication database;

an act of receiving a security token from a first of the plurality of users, the security token including one or more resource instance claims that identify the first user's purported access rights to the single instance of the one or more resources;

an act of validating the security token received from the first user, including validating the one or more resource instance claims in the security token by comparing the one or more resource instance claims in the security token to resource instance claims in the authentication database to verify that the one or more resource instance claims in the security token are included in the authentication database;

an act of providing, to the first user, access to the single instance of the one or more resources in accordance with the validated one or more resource instance claims;

an act of receiving a security token from a second of the plurality of users, the security token including one or more resource instance claims that identify the second user's purported access rights to the single instance of the one or more resources;

an act of validating the security token received from the second user, including validating the one or more resource instance claims in the security token by comparing the one or more resource instance claims in the security token to resource instance claims in the authentication database to verify that the one or more resource instance claims in the security token are included in the authentication database; and an act of providing, to the second user, access to the single instance of the one or more resources in accordance with the validated one or more resource instance claims.

18. The computer program product of claim 17, wherein the service delivery platform is part of an online service provided by a datacenter server.

* * * * *